INVENTOR
DENES ROVETI

INVENTOR
DENES ROVETI

United States Patent Office 3,448,378
Patented June 3, 1969

3,448,378
IMPEDANCE MEASURING INSTRUMENT HAVING A VOLTAGE DIVIDER COMPRISING A PAIR OF AMPLIFIERS
Denes Roveti, 1643 Forest Drive, Annapolis, Md. 21403
Filed June 21, 1965, Ser. No. 465,320
Int. Cl. G01r 27/16, 17/10, 27/28
U.S. Cl. 324—57                9 Claims

ABSTRACT OF THE DISCLOSURE

To provide an instrument capable of testing the characteristics of solid state electronic devices, this invention provides a balanced altrenating current circuit having a high impedance. The device to be tested is connected in parallel with one part of the high resistance to unbalance the circuit. The amount of unbalance is a measure of the impedance of the tested device. A pair of amplifiers are connected in series with each other and with a high value resistance across a direct current supply. Alternating current is supplied to the control electrodes of the two amplifiers. The amplifiers act as a variable voltage divider circuit causing the voltage at the junction of the two amplifiers to vary. The circuit values are arranged so that with no device to be tested connected in the circuit, the junction point is at zero potential. When a device to be tested is connected across the high value resistance, the balance is upset. In addition bias means are provided for the device to be tested and a phase shift meter can also be included.

---

This invention relates to test and control instruments, and more particularly, to instruments which are useful in determining the characteristics of semiconductors and components used with solid state devices and utilizing them for control and similar purposes.

Impedance measuring devices are not new. In fact, one of the oldest of electrical devices is the resistance bridge. However, recent developments in electronics and in electrical components has produced new, versatile devices which often require measuring instruments with special requirements for the accurate determination of their characteristics.

There are five conventional types of electrical impedance measuring instruments for determining the characteristics of electrical components. These can be categorized as:

(1) Balanced bridges.
(2) A constant voltage source having its output applied to the device to be tested and having a current indication.
(3) A constant current device having its output applied to the device being tested and having a voltage indication.
(4) Charge storing and the measurement of changes therein.
(5) The effect of a device being tested upon the tuning of an oscillator.

Of the above listed types of devices, all but the device of category 2 use measuring potentials applied to the device being tested which are, in themselves, determined by the characteristics of the device being tested. Thus, the measuring voltage is, in itself, a function of the value of the unknown. This often introduces errors which are in the order of, or greater than the permitted tolerances in the instrument or in the measurement. When determining the characteristics of small devices, small potentials and currents are necessary. When measuring large impedances, small potentials and currents are necessary. To avoid overloading and overheating during testing, small potentials and currents are necessary. Thus, the small values of the potentials and the currents which are used in determining the characteristics of many of the newer devices such as small semiconductors permit very small deviations before the errors introduced thereby become intolerable.

It is, therefore, an object of this invention to provide new and improved test instruments for determining electrical characteristics.

It is another object of this invention to provide a new and improved instrument for determining electrical characteristics of electrical devices, such as semiconductors.

It is a further object of this invention to provide a new and improved electrical test instrument for determining with substantial accuracy the electrical characteristics of semiconductor components and similar circuit elements.

It is still a further object of this invention to provide a new and improved versatile measuring instrument which is useful with a variety of sources of alternating energy and with a variety of display devices.

Other objects and advantages of this invention will become more apparent as the following description proceeds, which description should be considered together with the accompanying drawings in which.

Figure 1:
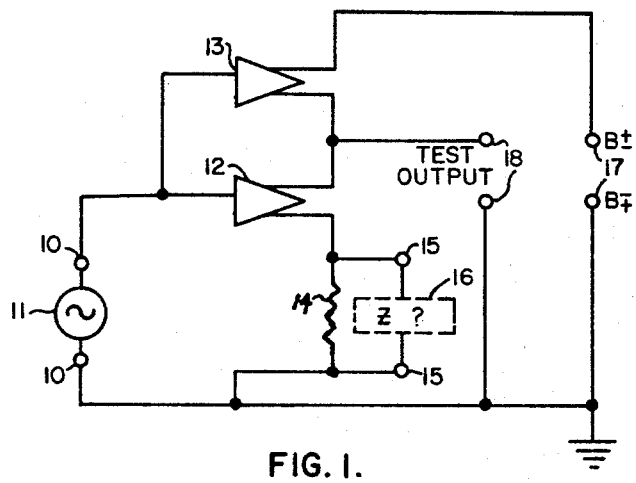
FIG. 1 is a block diagram of a basic impedance measuring instrument using the principles of this invention, which diagram illustrates the principles used.

Referring now to the drawings in detail, and more particularly to FIG. 1 the reference character 11 designates a source of alternating current which is connected to a pair of AC drive terminals 10. The output from the oscillator 11 is applied in paralled to the inputs of two amplifier stages 12 and 13. A pair of terminals 17 are provided to which a DC power supply can be connected to provide direct current to a series arrangement of the amplifiers 13 and 12 and an impedance 14. An unknown imdepance whose characteristics are to be determined may be connected to a pair of terminals 15 across the fixed and known impedance 14. The output is determined by a meter or the like, not shown, which is connected to test output terminals 18.

The apparatus shown by FIG. 1 is very diagrammatic and is intended to illustrate the principles involved rather than to illustrate a complete instrument. In operation, the two amplifier stages 12 and 13 are placed in series with the fixed impedance 14 across the direct current source connected to terminals 17. Thus, current flows from the B+ terminal 17, through amplifier 13, through amplifier 12, through the parallel combination of the impedance 14 and the unknown 16 to the B— terminal 17. At the same time, the AC drive signal from the oscillator 11 is applied to the control inputs of the amplifier stages 12 and 13. The impedances in the circuit, most of which are not shown, particularly the impedances of the amplifier 12, impedance 14 and the unknown 16 should be greater than the internal impedance of the oscillator 11. When this is true, the AC drive potential at the junction of the amplifier 12 with the impedance 14 is substantially constant and will vary only with the admittance of the unknown 16. Since the total impedance connected across the oscillator 11 is large, and since the variation in that impedance is small, variations in the unknown 16 will have very little effect upon the potential applied across the parallel arrangement of impedance 14 and the unknown 16. The total alternating current flowing in the circuit will depend upon the parallel impedance of the known 14 and the unknown 16, but the potential between the terminals 18 will depend upon the total impedance drop across the series arrangement of the amplifier 12 with the parallel impedance 14 and unknown 16.

3

Figure 2:
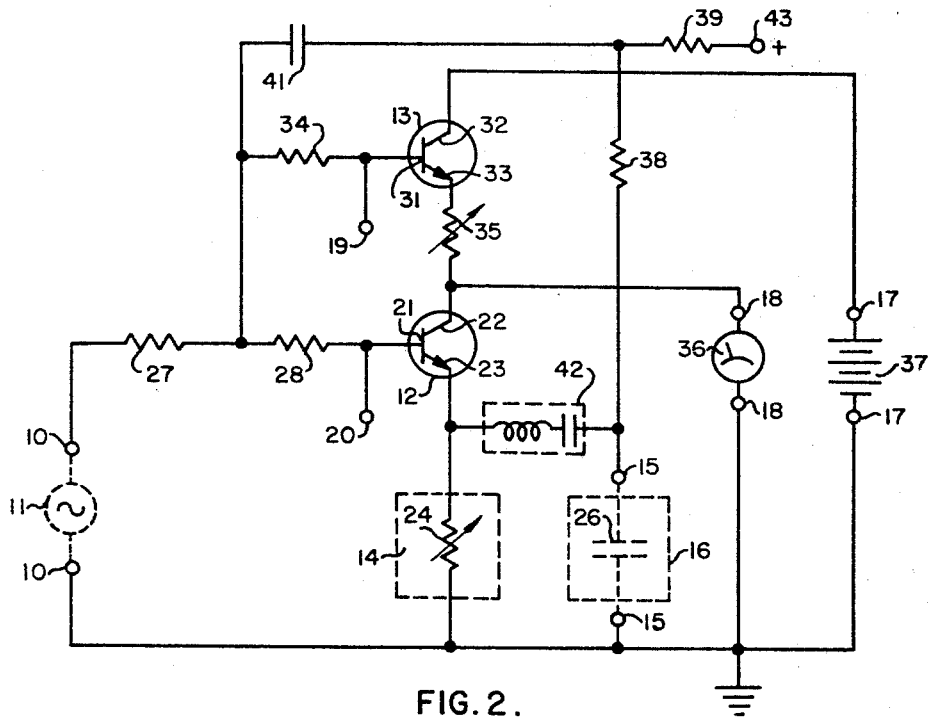
FIG. 2 is a schematic circuit diagram of a basic impedance measuring instrument using the principles of this invention.

One form of the circuit as it actually appears is shown in FIG. 2, where the oscillator 11 is shown connectable across the terminals 10. One side of the oscillator 11 is connected to ground and the other side is connected through resistors 27 and 28 to the base 21 of a transistor 12 and through the resistors 27 and 34 to the base 31 of the transistor 13. Transistor 12 further includes an emitter electrode 23 and a collector electrode 22 with the emitter 23 connected to one side of the impedance 14, shown here as a variable resistor 24, the other side of which is connected to ground. The collector 22 is connected to one side of a variable resistor 35, the other side of which is connected to an emitter electrode 33 of the transistor 13. A collector 32 of the transistor 13 is connected to the terminal 17 which is connected to the positive side of a source of direct current such as battery 37, the negative side of which is connected to the grounded terminal 17. Bias potential is applied to the base electrode 31 of the transistor 13 through terminal 19, and to the base 21 of the transistor 12 through terminal 20. A series tuned circuit connects the junction of the emitter 23 and the impedance 14 with the ungrounded terminal 15, to which the unknown impedance 16, shown here as a capacitor 26, may be connected. The ungrounded terminal 18 is connected to the junction of the resistor 35 and the collector electrode 22. A meter 36 is shown connected across the terminals 18. Terminal 43 connects a polarizing potential through a resistance 39 and a resistance 38 to the ungrounded terminal 15. A capacitor 41 connects the junction of the two resistors 38 and 39 with the ungrounded side of the oscillator 11.

The alternating current from the oscillator 11 is applied simultaneously to the base electrodes 21 and 31 of the transistors 12 and 13 to cause alternating currents to flow through those transistors. The signal at the collector 32 is 180° out of phase with the signal at the emitter 33, and the signal at the collector 22 is 180° out of phase with the signal at the emitter 23. The current flowing from base 31 through the emitter 33 is in phase opposition with the current flowing from base 21 through the collector 22. Thus, the current flowing through the resistor 35 is the summation of these two currents, and the resistors 35 and 24 can be selected so that with no unknown 16 connected to the terminals 15, the AC potential at the upper terminal 18 is zero. When an unknown impedance 16 is connected to the terminals 15, the impedance of the collector-emitter circuit of the transistor 12 changes, changing the gain of that transistor and the phase of the AC current passing therethrough. The current in the collector 22-base 21 path no longer equals the current in the base 31-emitter 33 path, and the resultant flows through the transistor 12 to ground. The voltage drop across the transistor 12 circuit appears as an indication on the meter 36. So long as the circuit is operating on the linear portion of the curve for the transistor 12, the reading on the meter 36 is directly proportional to the admittance of the unknown 16.

When the unknown is a semiconductor device, it is desirable to be able to bias it with direct current to measure its characteristics at the operating points at which it will be used. The direct current source connected to the terminal 43 provides the polarizing and biasing current for the unknown 16 through resistors 39 and 38. The tuned circuit 42 couples the alternating current from the oscillator 11 to the unknown 16 while blocking the direct or slowly varying current applied to the terminal 43 from reaching the transistor 12. At the same time, the alternating current from the oscillator 11 is applied through the capacitor 41 to the resistor 38 so that both sides of the resistor 38 are at about the same alternating current potential. The AC potential drop across the resistor 38 then does not vary and the potential drop of the resistor itself follows any variation in the alternating current potential from the oscillator 11. Thus, the resistor 38 does not appear as a load on the transistor 12 while permitting the application of direct current to the unknown 16.

4

When no impedance is connected to the terminals 15, there is no potential applied across the terminals 18. When, however, an unknown impedance 16 is connected to the terminals 15, then there is a potential applied across the terminals 18. In effect, the circuit of FIG. 2 operates as a pseudo-bridge which is linearly unbalanced by changes in the impedance in one leg. However, the circuit of FIG. 2 has one side of the oscillator 11, one side of the unknown impedance 16, one side of the meter 36 and one side of the direct current source 37 all connected to ground. So that, even with the obvious advantages in sensitivity and linearity of an impedance bridge, the circuit of FIG. 2 has the added advantages of grounded components. Add to that the advantage of being able to bias a semiconductor with direct current without disturbing the operation of the circuit, and the advantages of the impedance measuring device of this invention becomes more obvious.

Figure 3:
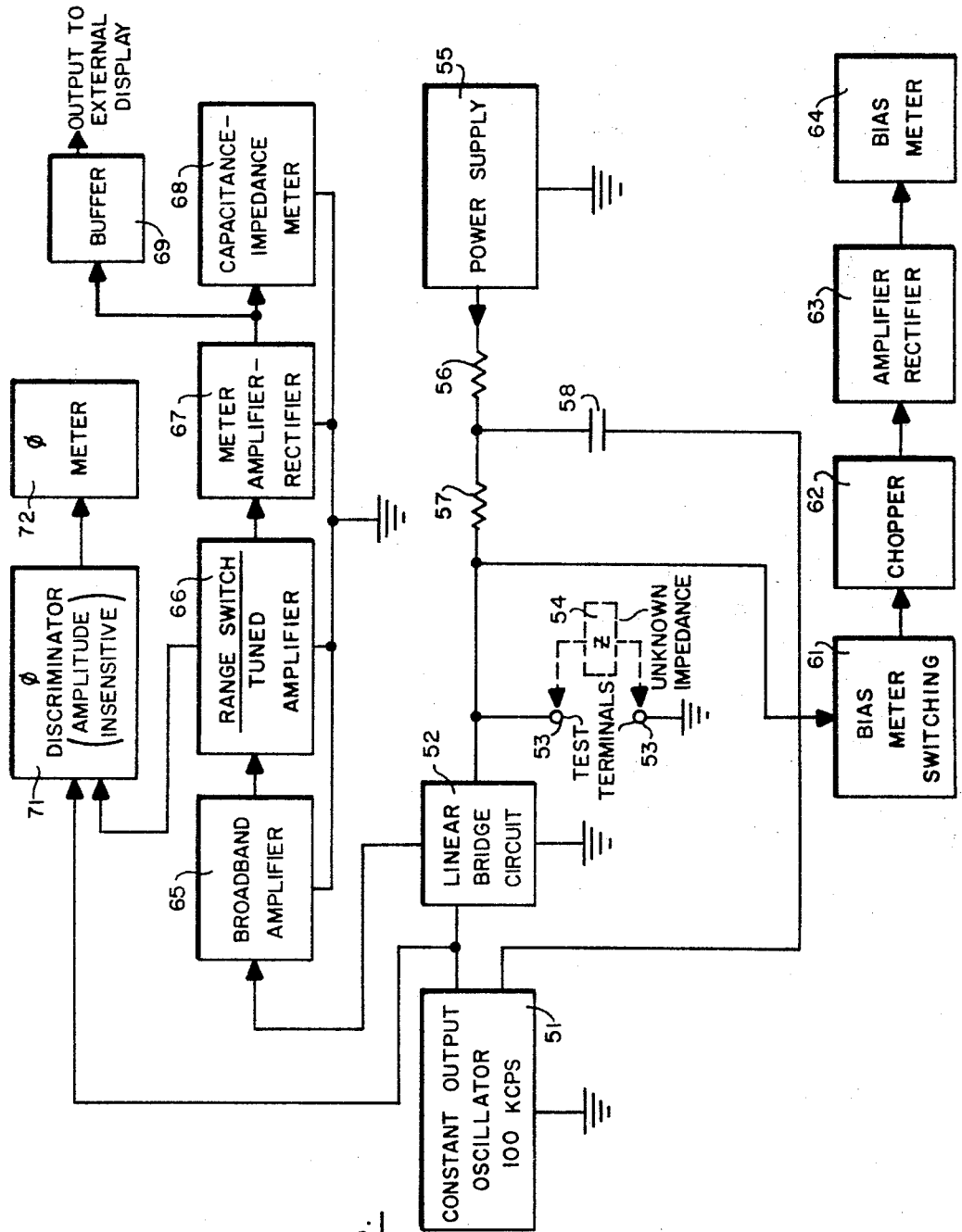
FIG. 3 is a block diagram of a complete electrical test instrument incorporating the device of FIG. 2.

A more complete test instrument which uses the impedance testing device of FIG. 2 is shown in FIG. 3 in block form. A constant output oscillator 51, corresponding to the oscillator 11 of the device of FIG. 2, applies an alternating current signal to a linear bridge circuit 52, which corresponds to the arrangement in FIG. 2 for measuring the characteristics of impedances. The unknown impedance whose characteristics are to be measured is shown in dashed lines in FIG. 3 at 54 to be connected across test terminals 53. A power supply 55 applies direct current bias through resistors 56 and 57 to the test terminals 53. Some of the alternating current from the oscillator 51 is applied through a capacitor 58 to the junction of resistors 57 and 58 to bootstrap resistor 57. The bias output from the power supply 55 is applied through a meter switching device 61, a chopper 62 and an amplifier 63, which includes a rectifier, to a meter 64. This indicates the bias applied to a semiconductor which is connected across the terminals 53. The output from the bridge 52 is applied to the input of a broadband amplifier 65 to ensure linearity of amplification, to a tuned amplifier and range switch 66 to eliminate interference and to provide switching for the measuring instrument, through a meter amplifier-rectifier device 67 to provide a direct current signal proportional to the bridge output, and to a meter 68 which indicates the amount of unbalance of the bridge 52. Coming off from the range switch before it passes through the tuned amplifier 66, the alternating signal representing the unbalance of the bridge 52 is applied to a phase discriminator 71 whose output is applied to a phase meter 72. In addition, a buffer 69 is provided in parallel with the meter 68 to permit the connection of additional external display devices to the system so that the results can be monitored from additional locations.

The oscillator 51, the linear circuit 52, the test terminals 53, resistors 57 and 56, power supply 55, and capacitor 58 are all shown in equivalents in the device of FIG. 2. These components operate as described above. The output of the oscillator 51 is applied to a linear circuit, which, in FIG. 2, included the transistors 12 and 13 and the resistors 35 and 14. The test terminals 53 are actually connected across the fixed resistance, 14 and the unknown device to be tested is connected thereto. When the linear circuit 52 is unbalanced by the connection of the unknown 54 to the test terminals 53, an alternating current signal which is proportional in amplitude to the amount of the unbalance is applied to the input of the broadband amplifier 65 wherein it is amplified. To provide further amplification and rejection of transients, inductively picked-up signals, and the like, the output from the broadband amplifier is then applied to the tuned amplifier 66, which includes a meter range switch. The range switch is used in the same manner as any range switch in a test instrument. The meter rectifier 67 converts the alternating current signal into a proportional direct current which is applied to a DC meter 68 to indicate the amount of unbalance of the linear circuit 52. In turn, the amount of unbalance of the linear circuit 52 is proportional directly, to the magnitude of the admittance of the unknown 54 connected across the test terminals 53. So the reading of the meter 68 is proportional to the admittance of the unknown 54.

As explained in the discussion of FIG. 2, it is often desirable when testing semiconductors to be able to bias them to a selected operating point. To this end, the power supply 55 has been provided, and it is connected to the unknown 54 through resistors 56 and 57. In addition, alternating current from the oscillator 51 is applied to the two sides of the resistor 57 through the linear circuit 52 and through the capacitor 58, so that the resistor 57 does not appear as an AC load on the linear circuit 52. So that the operating points of the semiconductor being tested may be known, the complete instrument shown in FIG. 3 includes a branch circuit for measuring the amount of bias applied to the semiconductor being tested. This circuit includes the bias meter switching mechanism 61 which permits switching the range of the instrument to permit measuring a wide range of bias potentials, and a chopper to convert the direct current bias potentials into alternating current so that it may be readily amplified by the amplifier 63. The amplifier 63 further contains a rectifier to reconvert the amplified signal into direct current so that it may operate the meter 64. This circuitry is standard test instrument circuitry. As mentioned in the discussion of the circuit of FIG. 2, the connection of an unknown device 54 to be tested to the test terminals 53 modifies the gain of the transistor 12. This changes the amount of current flowing through the collector 22 circuit and also its phase. The amount of phase shift is also an important value to be measured since it indicates the type of impedance which is connected to the test terminals 53. Thus, a capacitance connected to the test terminals 53 does not cause the same phase shift of the signal passing through the transistor 12 as does an inductor. The alternating current signal output from the linear circuit is taken from the output of the range switch 66 but before it passes through the tuned amplifier, which may alter the phase relationships. This signal is applied to an amplitude insensitive, phase discriminator 71 whose output is a direct current which is proportional in amplitude to the amount of phase shift of the signal and whose polarity is indicative of the direction of the phase shift. This direct current signal is applied to the phase meter 72 which indicates the amount and direction of the phase shift in the alternating current signal from the oscillator 51 which is caused by the unknown 54 connected across the test terminals 53. The phase meter 72 is preferably a zero-center meter which can indicate by the direction of deflection of its needle the direction of the phase shift. The phase discriminator 71 is fed with a direct output from the oscillator 51 so that the phases of the signals into the linear circuit and that out of the linear circuit can be directly compared.

In addition to the above-mentioned operations of the equipment, sensitive remote or in-circuit measurements can also be made with the device of this invention. For example, temperature variable parameters of solid state devices may be monitored in ovens or in operation in complex equipment, stage-by-stage. A probe is used which is provided with two shields and a single center conductor. The center conductor is connected to the high voltage side of the test terminals 15 of FIG. 2, while the outer shield is connected to the grounded test terminal 15. The inside shield is connected to source terminal 10. Since the inside shield is at the same AC potential as the center conductor, the effect of the probe capacitance is eliminated, and only unknown impedance will be seen by the test terminals 15. In addition to measuring admittance, the direct current potential can be measured at the same time by connecting an additional D.C. voltmeter to the D.C. source terminal 43. This provides a device for remotely indicating admittance and D.C. potential of an operating circuit.

As mentioned above, the instrument of this invention provides a testing device which incorporates the accuracy and sensitivity of a balanced bridge with the advantages of a device which has one side of each of its components grounded. This is true of the complete instrument shown in FIG. 3, also. It is realized that the above disclosure may indicate to others in the art how the principles of this invention may be used in other ways without departing from its spirit.

What is claimed is:

1. A test instrument for determining electrical characteristics of electrical circuit components; said instrument comprising first and second amplifiers, each of said amplifiers including an input and an output; a first impedance; means for connecting the output of said amplifiers and said impedance in a series circuit; means for connecting said series circuit across a source of direct current; means for applying the same alternating current signal to the input of said amplifiers; a balancing impedance connected in said series circuit between said amplifiers for providing zero current at a junction point between said balancing impedance and the amplifier connected to said first impedance; means for connecting a circuit component to be tested across said first impedance, whereby the balance of said series circuit is upset; and voltage measuring means connected to said junction point.

2. A test instrument for determining the electrical characteristics of electrical circuit components, said instrument comprising a first impedance, a first four terminal network and a second four terminal network, means for connecting one pair of terminals of said first and of said second four terminal network together in series and in series with said first impedance, means for connecting said series arrangement across a source of direct current, means for applying the same alternating current to the other pair of terminals of both said first and said second four terminal networks to cause alternating current to flow through said series connection of said one pair of terminals, an impedance for balancing said instrument being selected so that the alternating current in said two networks is equal and no alternating current flows through the junction between the one pair of terminals of said first and second four terminal networks, means for connecting an unknown impedance in parallel with said first impedance to upset said balance, and voltage measuring means connected to the junction of said first and second four terminal networks for indicating the current flowing therethrough.

3. An electrical test instrument for determining the characteristics of electrical circuit components, said instrument comprising a first active device and a second active device, means for applying the same alternating current signal to the inputs of each of said first and second active devices, first impedance means for connecting together the output circuits of said first and second active devices and said first impedance means in a series circuit, means for connecting said series circuit across a source of direct current, second impedance means connected between said first and second active means, said first and second impedance means having values such that the junction point between said second impedance means and the active device connected to said first impedance means is an alternating current null point, means for connecting an electrical circuit component to be tested across said first impedance, means for connecting a voltage measuring instrument to said junction point to indicate the amount of unbalance produced by an electrical circuit component connected across said second impedance, means for providing a direct current bias to an electrical circuit component connected across said second impedance, said direct current bias means including means for applying to said biasing means the alternating current signal applied to the inputs of said first and second active devices so that said biasing means does not load said second active device.

4. An alternating current electrical test instrument for determining the characteristics of electrical circuit components; said instrument comprising a first and a second active circuit element each of which includes an input and an output which are 180° out of phase, a first signal path including the output of said first active element; a second signal path including the output of said second active element; a first impedance means for connecting together the output circuits of said first and second active elements and said first impedance in a series circuit; means for applying the same alternating current signal to the inputs of both of said first and second active elements; and a second impedance in said first signal path connected to said second signal path; the values of said first and second impedances being such to produce an alternating current null at a junction point between said second impedance and said second path; means for connecting a circuit component to be tested across said first impedance to upset the balance at said junction point and void said null; means for connecting a voltage measuring instrument to said junction point to indicate the amount of voltage deviation produced by the connection of the circuit component across said first impedance; one side of each of said second impedance, said component to be tested and said measuring instrument being connected to a common point; and a source of direct current connected across said series circuit; one side of said source also being connected to said common point; said common point serving as a ground.

5. An alternating current electrical test instrument for determining the characteristics of electrical circuit components, said instrument comprising a first and a second active circuit element each of which includes an input and an output which are 180° out of phase, a first signal path including the output of said first active element, a second signal path including the output of said second active element, a first impedance means for connecting together the output circuits of said first and second active elements and said first impedance in a series circuit, means for applying the same alternating current signal to the inputs of both of said first and second active elements, a second impedance in said first signal path connected to said second signal path, the values of said first and second impedances being such to produce an alternating current null at a junction point between said second impedance and said second path, means for connecting a circuit component to be tested across said first impedance to upset the balance at said junction point and void said null, means for connecting a voltage measuring instrument to said junction point to indicate the amount of voltage deviation produced by the connection of the circuit component across said first impedance, said means for connecting a component to be tested comprising a pair of test terminals, one of said test terminals being grounded and the other of said test terminals being connected to the ungrounded side of said second impedance, and means for applying a direct current bias across said series circuit and to said ungrounded test terminal.

6. The instrument defined in claim 5 wherein said means for applying said bias includes a limiting impedance, and means for connecting across said limiting impedance the alternating current signal applied to the inputs of said first and second active devices so that said limiting impedance does not load the alternating current circuits.

7. The instrument defined in claim 6 further including means coupled to said ungrounded test terminal for indicating the amplitude and polarity of the direct current bias applied thereto.

8. The instrument defined in claim 7 further including means for stabilizing the amplitude of the direct current bias applied to said ungrounded test terminal to assure constancy of its amplitude.

9. An alternating current electrical test instrument for determining the characteristics of electrical circuit components, said instrument comprising a first and a second active circuit element each of which includes an input and an output which are 180° out of phase, a first signal path including the output of said first active element, a second signal path including the output of said second active element, a first impedance means for connecting together the output circuits of said first and second active elements and said impedance in a series circuit, means for applying the same alternating current signal to the inputs of both of said first and second active elements, means for connecting said series circuit across a source of direct current, a second impedance in said first signal path connected to said second signal path, the values of said first and second impedances being such to produce an alternating current null at a junction point between said second impedance and said second path, means for connectig a circuit compoent to be tested across said first impedance to upset the balance at said junction point and void said null, means for connecting a voltage measuring instrument to said junction point to indicate the amount of voltage deviation produced by the connection of the circuit component across said first impedance, a phase comparator having two inputs and an output, means for connecting one of said comparator inputs to said junction point for sensing the alternating current signal at that point, means for applying to said other of said comparator inputs the alternating current signal applied to the inputs to said active devices so that said comparator compares said two signals, and means for connecting to the output of said comparator to an indicator for indicating the phase difference in the alternating current caused by a component to be tested.

References Cited

UNITED STATES PATENTS

| | | | |
|---|---|---|---|
| 2,457,165 | 12/1948 | McNamee | 323—75 |
| 2,611,862 | 9/1952 | Riddle et al. | 324—62 XR |
| 3,034,044 | 5/1962 | Konigsberg | 324—57 |

EDWARD E. KUBASIEWICZ, *Primary Examiner.*

U.S. Cl. X.R.

324—158